(12) United States Patent
Chayat (10) Patent No.: US 7,295,626 B2
(45) Date of Patent: Nov. 13, 2007

(54) ORTHOGONAL DIVISION MULTIPLE ACCESS TECHNIQUE INCORPORATING SINGLE CARRIER AND OFDM SIGNALS

(75) Inventor: Naftali Chayat, Kfar Sava (IL)

(73) Assignee: Alvarion Ltd., Tel Aviv (IL)

( * ) Notice: Subject to any disclaimer, the term of this patent is extended or adjusted under 35 U.S.C. 154(b) by 918 days.

(21) Appl. No.: 10/096,148

(22) Filed: Mar. 8, 2002

(65) Prior Publication Data

US 2003/0169824 A1    Sep. 11, 2003

(51) Int. Cl.
*H04L 27/00*    (2006.01)

(52) U.S. Cl. ......................... 375/295; 296/260

(58) Field of Classification Search ............... 375/295, 375/296, 260
See application file for complete search history.

(56) References Cited

U.S. PATENT DOCUMENTS 6,590,944 B1 *  7/2003  Kroeger ................... 375/340
6,977,915 B2 * 12/2005  Chen et al. ............... 370/335
2005/0201326 A1 *  9/2005  Lakkis ...................... 370/329

\* cited by examiner

*Primary Examiner*—Chieh M. Fan
*Assistant Examiner*—Jason M. Perilla
(74) *Attorney, Agent, or Firm*—Browdy and Neimark, PLLC (57) ABSTRACT

A multiple access technique is described, which is capable of maintaining orthogonality between transmitted signals in multipath conditions, even when part of or all of the transmitted signals belong to the family of Single Carrier modulation. The Single Carrier signals are converted into multi-carrier signals which utilize just a fraction of the spectral lines by transmitting each fragment of data several times. The orthogonal multiplexing technique enables transmitters to enjoy both the advantages of OFDMA, such as noninterference between signals, adaptive bandwidth allocation and wideband diversity, and the Peak-to-Average Power Ratio advantage of the single carrier modulation. The multiplexing technique described allows to incorporate in the same multiple access system both OFDM signals and Single Carrier signals.

19 Claims, 9 Drawing Sheets

Fig. 1

Generic structure of Point-to-Multipoint Multiple Access System

Fig. 2a

Single Carrier transmitter (prior art)

Fig. 2b

Single Carrier - Frequency Domain Equalized transmitter (prior art)

Fig. 2c

Ortogonal Frequency Division Multiplex (OFDM) transmitter (prior art)

Fig. 2d

Ortogonal Frequency Division Multiple Access (OFDMA) transmitter (prior art)

Fig. 3a — Segment-Repeat-Add cyclic prefix

Fig. 3b — Repetitive waveform

Fig. 3c

Ortogonal Single Carrier Multiple Access (OSCMA) transmitter

Repeated-waveform OFDMA transmitter

Fourier Transform based OSCMA transmitter

Fig. 4d

Before NCO generated frequency offset

After NCO generated frequency offset

Example of hierarchical decomposition of the subcarrier resource to OSCMA, regular OFDMA and irregular OFDMA transmitters

Fig. 8a Receiver for a multiple access system involving OSCMA and OFDMA transmitters

Fig. 8b

Orthogonal Frequency Division Multiple Access receiver

Fig. 8c

Orthogonal Single Carrier Multiple Access receiver

ORTHOGONAL DIVISION MULTIPLE ACCESS TECHNIQUE INCORPORATING SINGLE CARRIER AND OFDM SIGNALS

BACKGROUND OF THE INVENTION

1. Technical Field

This invention relates generally to multiple access systems, and in particular to a wireless multiple access networks utilizing sets of orthogonal waveforms for separation of multiple simultaneously transmitting users.

Multiple access systems enable many simultaneous users to share the same fixed bandwidth radio spectrum. The bandwidth, which is allocated to any radio system, is always limited—for example, mobile phone systems use 25 MHz in each direction. On the other hand, we are interested in allowing multiple users simultaneous access to the network, for example in order to maintain multiple phone conversations in parallel. FDMA, TDMA and CDMA are the three major methods of sharing the available bandwidth to multiple users in wireless system. There are many extensions, and hybrid techniques for these methods, such as OFDM, and hybrid TDMA and FDMA systems.

Abbreviations

| | |
|---|---|
| OFDM | Othrogonal Frequency Division Multiplexing |
| OFDMA | Orthogonal Frequency Division Multiple Access |
| OSCMA | Orthogonal Single Carrier Multiple Access |
| BPSK | Binary Phase Shift Keying |
| QPSK | Quaternary Phase Shift Keying |
| OQPSK | Offset Quaternary Phase Shift Keying |
| PAM | Pulse Amplitude Modulation |
| QAM | Quadreature Amplitude Modulation |
| OQAM | Offset Quadrature Amplitude Modulation |
| MSK | Minimum Shift Keying |
| FSK | Frequency Shift Keying |
| CPFSK | Continuous-Phase Frequency Shift Keying |
| NCO | Numerically Controlled Oscillator |
| FFT | Fast Fourier Transform |
| IFFT | Inverse Fast Fourier Transform |
| FEC | Forward Error Correction |
| ISI | Inter-Symbol Interference |
| ICI | Inter-Carrier Interference |
| PAPR | Peak-to-Average Power Ratio |
| MAC | Medium Access Control |

2. Prior Art

In Frequency Division Multiple Access (FDMA), the available bandwidth is subdivided into a number of narrower band nonoverlapping channels. For each user is allocated a unique frequency band designated for data transmission. During a call, no other user can use the same frequency band. Each user is allocated a forward link channel (from the base station to the mobile phone) and a reverse channel (back to the base station), each being a single way link. The transmitted signal on each of the channels is continuous allowing analog transmissions. In TDMA the users send bursts of data in assigned time slots. This technique, while having numerous advantages, requires higher instantaneous transmit power or lower link loss due to higher instantaneous data rate.

There is a special interest in waveforms which maintain orthogonality under conditions of dispersion in the medium, and in particular in the wireless multipath channels. The Orthogonal Frequency Division Multiplex (OFDM) modulation, which uses a plurality of narrowband waveforms (subcarriers), was developed with this objective in mind. OFDM is similar to FDMA in the sense, that the available bandwidth is subdivided into multiple channels. Contrary to FDMA, however, OFDM achieves orthogonality between the subchannels in spite of the fact that their spectra overlap. This results in closer packing of frequency subchannel and more efficient use of the spectrum. Unlike conventional single-carrier modulation schemes—such as AM/FM (amplitude or frequency modulation)—that send only one signal at a time using one radio frequency, OFDM sends multiple high-speed signals concurrently on specially designed, orthogonal carrier frequencies. The result is much more efficient use of bandwidth as well as robust communications during noise and other interferences.

Recently an Orthogonal Frequency Division Multiple Access (OFDMA) technique was developed, which is a variant of OFDM. This technique assigns subsets of subcarriers to different transmitters in order to maintain orthogonality (sect separation) between the signals of different users. OFDMA facilitates adaptive bandwidth allocation to the users by varying the amount of subcarriers allocated to each user, and improves the Signal-to-Noise Ratio (SNR) to power-limited users by reducing their effective noise bandwidth. There are several strategies of allocating sets of subcarriers to users, optimizing different aspects of the system—multipath induced diversity, interference between different users, ease of channel estimation etc. The techniques for modulation and demodulation of OFDM waveforms using Fast Fourier Transform techniques is a common art today, as well as techniques for equalization and error correction decoding of OFDM in presence of multipath.

The relative disadvantage of OFDM is the high crest factor, known also as Peak-to-Average Power Ratio (PAPR) of the OFDM waveforms. A high peak to average ratio is created due to fact that at each instant the transmitted OFDM signal is a sum of a large number of slowly modulated subcarriers. A Single Carrier system avoids this effect, so the peak-to average transmitted power ratio for single carrier modulated signal is smaller.

This feature of OFDM motivated the proponents of Single Carrier modulation (which is better in PAPR respect) to develop processing techniques, which improve its performance in highly dispersive media.

Recently such a technique was developed, known as Frequency-Domain-Equalized Single Carrier modulation (FDE-SC). This technique utilizes concepts similar to OFDM in the sense that the receiver utilizes Fast Fourier Transform based processing for equalization. The FDE-SC waveforms, while lending themselves to convenient equalization, do not possess the qualities of OFDMA in the sense of adaptive bandwidth allocation in multiple access environments.

Therefore it is the object of the present invention to provide an innovative modification of the FDE-SC modulation, which enables using multiple-access setting in a way which allows both maintaining the orthogonality between the different received signals while also facilitating adaptive bandwidth allocation. Moreover, the proposed scheme allows creation of multiple access systems in which both Single Carrier (SC) signals and OFDM signals are used so that orthogonality is maintained for SC signals as well as to OFDM signals or any combination thereof. These advantages are achieved while maintaining the PAPR advantage of single carrier modulation. We shall denote the proposed scheme as Orthogonal Single Carrier Modulation (OSCM).

FIGS. 2a to 2d show basic examples of the transmitters structure according to prior art techniques. The structure of the transmitters is presented by the basic essential signal processing operations, for comparing the different prior art techniques and further to explain the improvements and modifications of the present invention.

Figure 2A:
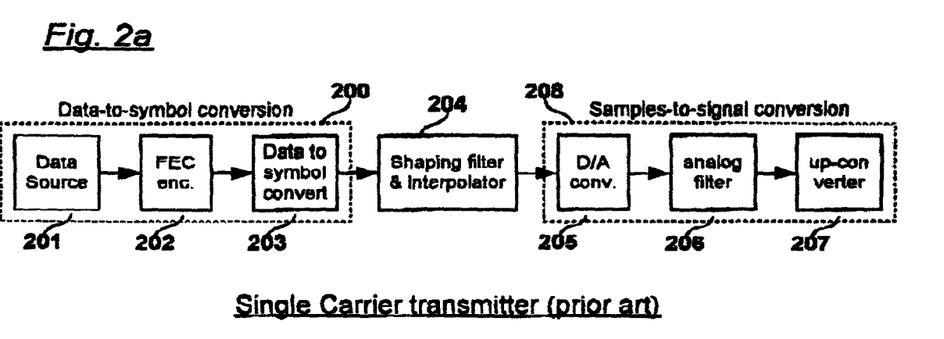
FIG. 2a is a simplified illustration of a prior art single carrier transmitter

FIG. 1a illustrates the basic structure of traditional single carrier transmitter. The operation of this transmitter is further explained. Block 200 describes a typical module for converting original data to signal symbols. The data received from data source 201 is first encoded using Forward Error Correction (FEC) encoder 202 (FEC encoding enables the receiver to correct errors automatically without requesting re-transmission). The encoded data bits are converted to carrier symbols by modulator 203, by converting small groups of bits to the required amplitude and phase based on pre-defined modulation scheme such as ASK, PSK, QAM, OQPSK, OQAM, MSK, CPFSK or any other appropriate method of mapping bit groups to symbols. As this set of operations is performed for all digital modulation schemes, we will collectively denote the process of converting the source data into a stream of encoded modulation symbols "data-to-symbol conversion" 200 and will not deal further with the internals of this process.

The shaping filter and the interpolator unit 204 define a signal shaping filtering which is required by the respective modulation schemes for achieving the desired spectral efficiency. For single carrier signals it is commonplace to use Square Root Raised Cosine (SRRC) characteristics, for achieving low Inter-Symbol Interference (ISI) after matched filtering on the receive side. The interpolation filter increases the sampling rate and rejects the extra images of the signal spectrum resulting from the interpolation operations.

Block 208 aggregates several components jointly to convert the signal samples into the actually transmitted signal. The signal is initially converted from digital samples to an analog signal using a Digital-to-Analog converter 205. The analog signal is further filtered by an analog filter 206, removing any unwanted frequency components which remained after the action of the interpolator within block 104. At the end, an up-converter 207 converts the signal to the desired frequency band and transduces the resulting signal into the transmission medium, for example an antenna in the case of wireless transmission. As the operations contained within block 208 are commonplace in every digital transmitter, we will refer to those collectively as "Samples-to-signal conversion" (block 208).

Figure 2B:
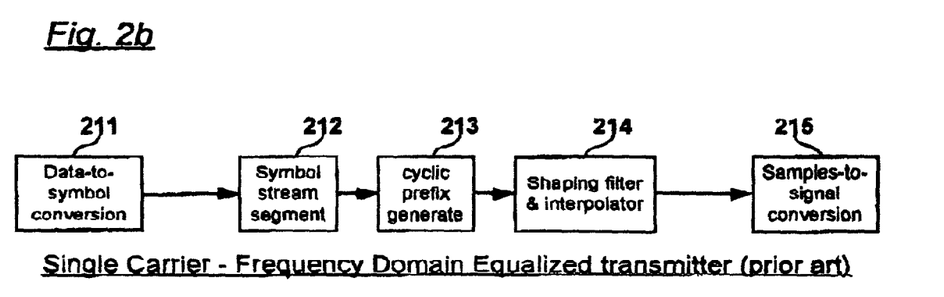
FIG. 2b is a simplified illustration of a prior art Single Carrier—Frequency Domain Equalized transmitter

FIG. 2b illustrates the structure of FDE-SC transmitter. After data-to-symbol conversion 211 (same as block 100 in FIG. 1a), the symbol stream is segmented by unit 212 creating blocks of fixed size. Each block of symbols is processed by the cyclic prefix generator 213, creating a waveform with periodic property which is essential to the proper functioning of the fast Fourier transform (OFT) operation at the receiver end. The resulting stream of symbols is then subjected to filtering and interpolation (214) and to conversion to the actually transmitted signal in block 215.

Figure 2C:
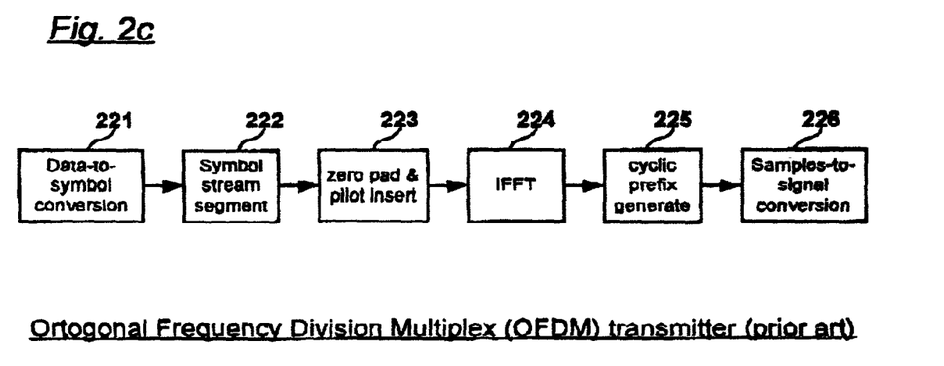
FIG. 2c is a simplified illustration of a prior art OFDM transmitter
Figure 2D:
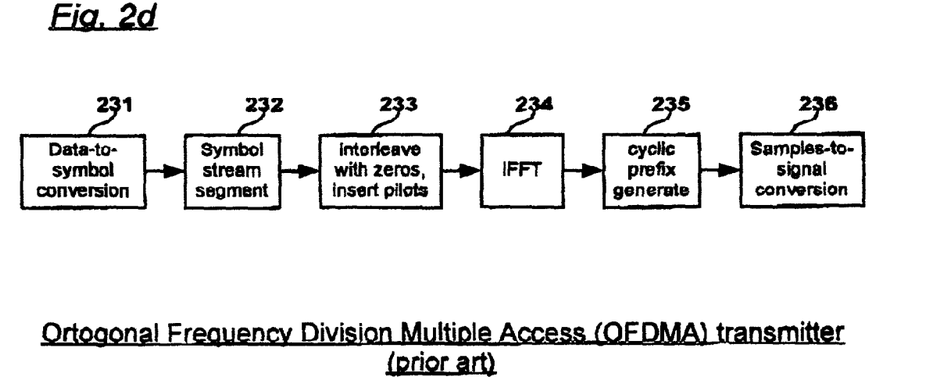
FIG. 2d is a simplified illustration of a prior art OFDMA transmitter

The process of OFDM transmitter bears similarity to the FDE-SC transmitter as seen in the illustration of the transmitter structure (FIG. 2c). In this process the generated symbols are segmented into groups (222), each corresponding to a separate OFDM symbol. The symbols are located within a numeric array representing frequency samples, the numeric array is further edited by inserting zeros and pilot symbols at appropriate locations using unit 323, and then converted from frequency into time samples by inverse FFT modulation unit 224. The time samples are further processed by cyclic prefix generator 225, and converted to the actually transmitted signal in block 226.

The OFDMA transmitter (FIG. 2d) is similar to the OFDM transmitter in terms of processing. The main difference is that the transmitter utilizes only a fraction of the frequency subcarriers within the operational frequency channel. The rest of the subcarriers are used by other transmitters within the multiple-access network, and the sets of subcarriers are assigned to each transmitting station according to allocation policy of the Medium Access Control (MAC) entity. In order to transit on the assigned subcarriers only, block 233 inserts the encoded data symbols to the corresponding locations within the numeric array, adds pilot subcarriers and fills with zeros all the unused locations. From here the processing continues as in OFDM transmitter, by adding a cyclic prefix 235 and converting the samples to the actually transmitted signal in block 236.

At this point, it is appropriate to discuss the subcarrier allocation strategies used in different OFDMA systems, as these considerations are applicable to the transmitters operating according to present invention. The dominant factors affecting the strategy are the correlation in channel coefficients of adjacent subcarriers, on one hand, and the interference between adjacent subcarriers (ICI) on the other hand. One possible policy is to pick the allocated subcarriers from locations spread all over the frequency channel. An alternative policy is to cluster the subcarriers assigned to a transmitter together in order to optimize the interaction between signals of different stations (as only the edges of the allocations interact). This policy also has beneficial effect on the estimation of channel response. Within the wideband subcarrier allocation policies, we may differentiate between those, which assign the subcarriers to a station at regular intervals, and those, which allocate irregularly spaced locations. The irregular allocation of OFDMA subcarriers has the beneficial effect that for any two stations only a fraction of the subcarriers are adjacent, thus reducing the mutual interference. The irregular OFDMA technique was adopted in DVB-RCT uplink channel and in 802.16a broadband wireless access standard OFDMA mode.

REFERENCES

[1] IEEE P802.16a D1 Fixed Broadband Wireless Access System standard—draft.

[2] IEEE 80216t-01/01, D. and S. L. Ariyavisitakul, Frequency Domain Equalization For 2-11 Ghz Broadban Wireless Systems

SUMMARY OF THE INVENTION

In accordance with the present invention, a signal that is to be transmitted to a destination is segmented into fragments, and then each fragment is repeated several times. This operation causes the transmitted waveform to have a comb-like spectrum, as exemplified in FIG. 2b. Furthermore, a frequency shift is applied to the transmitted waveform, either by a physical oscillator, digitally by applying a Numerically Controlled Oscillator (NCO) to a waveform, or in frequency domain by-shifting the Fourier coefficients to new bin locations. Shifting the "combs" of the different users by different frequency shifts allows interleaving of the combs in a frequency domain in a manner, which facilitates their orthogonal separation on the receiving side.

The number of repetitions and the frequency offset can be changed dynamically on a per-user and per-allocation basis, facilitating thus dynamic bandwidth allocation.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein—

FIGS. 2a-2d bring examples of transmitters corresponding to prior art:

FIGS. 3a-3c illustrate the relation between time domain repetition and spectral properties of a signal:

FIGS. 4a-4c present different possible implementations of OSCMA transmitter:

FIGS. 8a-8c illustrate the receiver architecture of an orthogonal multiplexing multiple access system

DETAILED DESCRIPTION OF THE PREFERRED EMBODIMENTS

The basic concept of the present invention is to provide new modulation scheme for maintaining orthogonal relation between sequential signal carriers of multiple users using single carrier transmitter.

For better under standing of the new scheme let us review the generation of orthogonal signal, using OFDM system.

The Fast Fourier Transform (FFT) transforms a cyclic time domain signal into its equivalent frequency spectrum. This is done by finding the equivalent waveform, generated by a sum of orthogonal sinusoidal components. The amplitude and phase of the sinusoidal components represent the frequency spectrum of the time domain signal. The IFFT performs the reverse process, transforming a spectrum (amplitude and phase of each component) into a time domain signal. An IFFT converts a number of complex data points, of length which is a power of 2, into the time domain signal of the same number of points. Each data point in frequency spectrum used for an FFT or IFFT is called a bin.

The orthogonal carriers required for the OFDM signal can be easily generated by setting the amplitude and phase of each bin, then performing the IFFT. Since each bin of an IFFT corresponds to the amplitude and phase of a set of orthogonal sinusoids, the reverse process guarantees that the carriers generated are orthogonal.

Figure 3A:
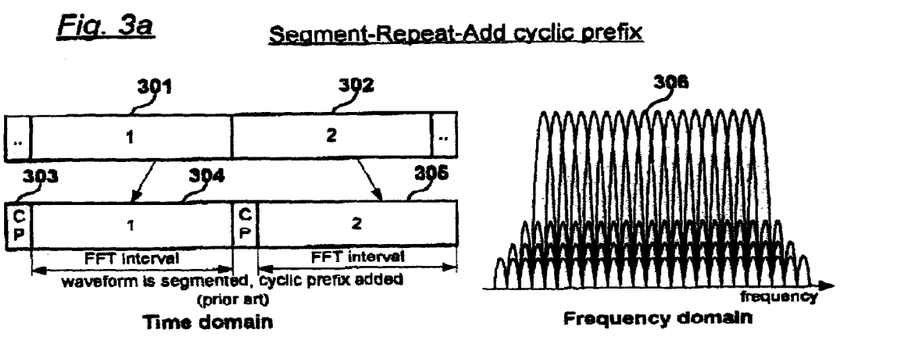
FIG. 3a illustrates a spectral decomposition of a Segment-Repeat-Add cyclic prefix According to prior art.
Figure 3B:
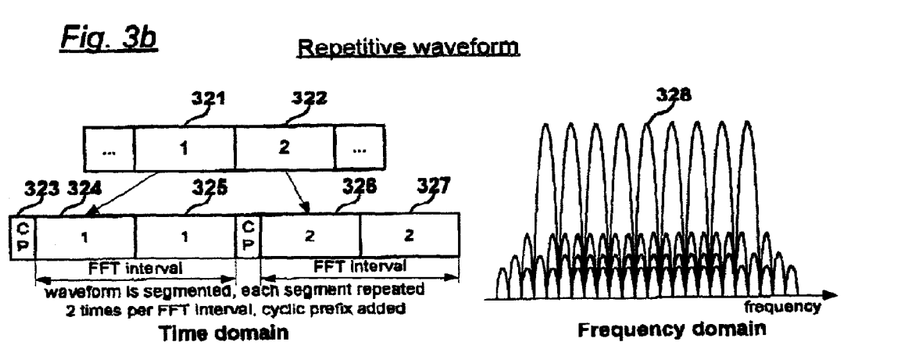
FIG. 3b illustrates a spectral decomposition of a waveform which contains two identical segments.
Figure 4A:
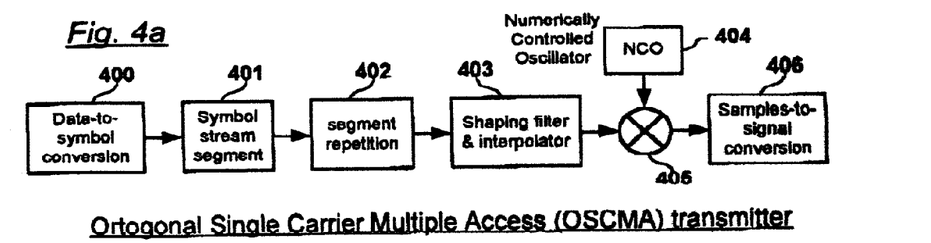
FIG. 4a is a simplified illustration of orthogonal Single Carrier Multiple Access (OSCMA) transmitter

The orthogonality between the signals of different transmitters, according to the present invention, is achieved by a different modulation method, not utilizing IFFT transformation technique. The basic operation of the suggested modulation is a replicating process for creating at least two repetition of the each signal segment. This operation creates a transmission spectrum having a "comb" like appearance, as seen in FIG. 3b. The "combs" created in this manner can now be interleaved, provided that an appropriate frequency offset is introduced between the signals. Such signal transmission configuration has orthogonal characteristics similarly to the OFDMA method. Yet, according to the present invention the modulation process can be implemented within a single carrier transmitter. Thus, the Peak-to-Average Power Ratio (PAPR) deficiency of multi carrier transmitter is avoided. A diagram block of the orthogonal single carrier multiple access (OSCMA) transmitter is illustrated in FIG. 4a.

The basic operation of this transmitter is similar to prior art transmitters as shown in FIG. 2a and FIG. 2b. The modulation process according to the present invention further comprises two main operations: segment replication and frequency offsetting. The second operation is preferably implemented by numerically controlled oscillator 404.

Both operations of replication and frequency offsetting is determined and controlled by the Medium Access Control (MAC) entity, which is located at the cellular base station.

The basic concept of the present invention is to utilize the modulation characteristic of the replication and frequency offsetting operations for improving the allocation polices.

Figure 1:
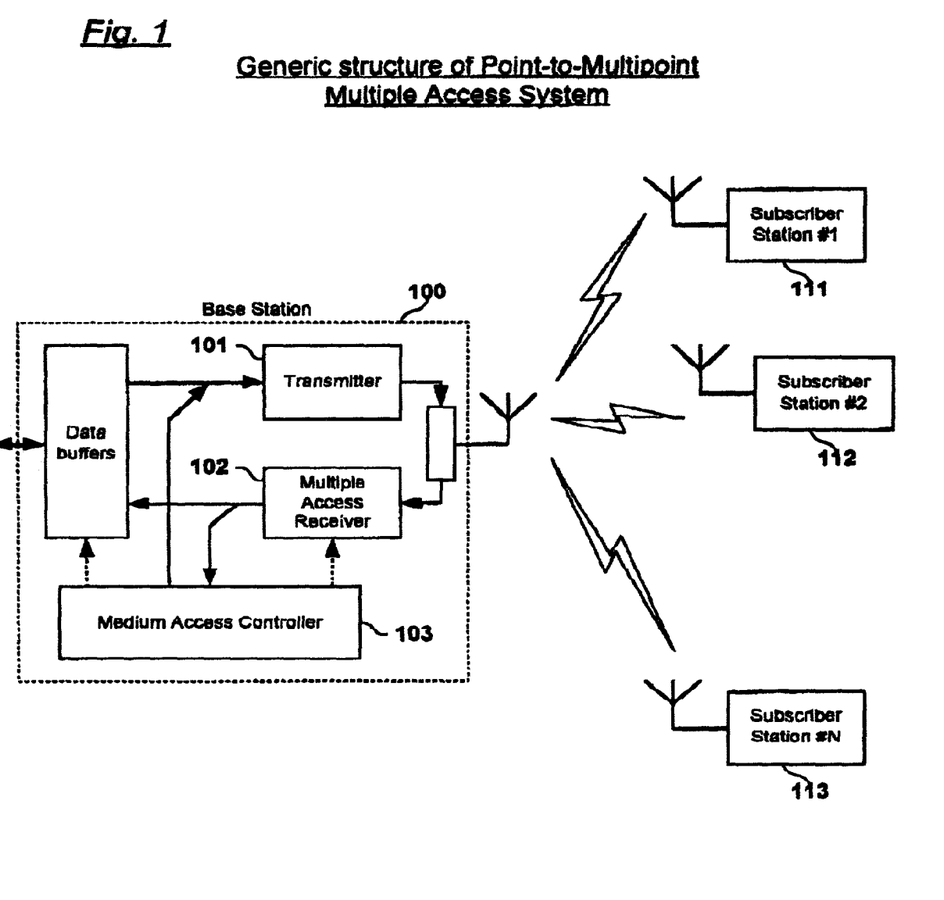
FIG. 1 is a block diagram representing the environment in which the present invention is practiced.

Present invention deals with an improvement of multiple access systems. FIG. 1 shows an example structure of a point-to-multipoint network. In this example the communication with multiple stations is performed through a wireless medium. The allocated frequency channel is shared among the stations, according to a medium access policy governed by the base station. The channel resource is partitioned into quanta, and those are allocated to the stations according to the traffic demand. The partitioning of the channel resource can be performed in many manners—TDMA, in which time slots are assigned, FDMA in which frequency subchannels are assigned, CDMA, in which coded signature waveforms are assigned, or, as in present invention, by specially designed orthogonal waveforms. The main elements of a base station 100 are a downstream transmitter 101, a multiple access receiver 102, and a MAC controller 103. The MAC controller at the base station decides how to allocate the upstream channel resource to the station and inserts into the downstream control information to the stations. In the case of TDMA the information is which station will use which time slot; in OFDMA—which station will use which subchannel etc. In parallel with informing the stations how to transmit the information, the MAC controller informs the multiple access receiver how to extract the information from the received signal (at what time, in which frequency subchannel etc.) and where to send the received information. Some of the received information may serve the MAC entity for deciding on future allocation policy. The matter of present invention is design of transmit waveforms for the upstream direction, with appropriate transmitter embodiments, and methods for dynamic allocation the channel resource to such transmitters.

Figure 3C:
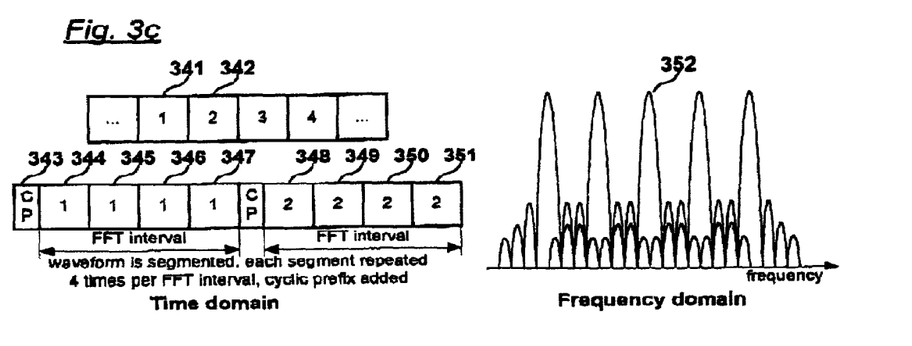
FIG. 3c illustrates a spectral decomposition of waveform which contains four identical segments.

The present invention adapts the regularly spaced subcarrier allocation policy, which is closely related to the (OSCMA) new modulation scheme suggested by the presented invention. FIGS. 3a to 3c depict the relation between the time domain properties and the frequency domain properties of a waveform composed of several repetition of a smaller segment. A waveform which has no repetitions, such as 304 or 305, will typically have distinct non-zero values for all of its Fourier coefficients, as exemplified in 306.

In the case that the FFT interval contains two repetition of same waveform, such as 324-325 or 326-327, the frequency spectrum, as exemplified in 328, possesses the property that only even Fourier coefficients may accept non-zero values, while the odd values are mathematically identical to zero.

In the case that the time domain signal is composed of four repetitions, as in 344-347 or 348-351, the spectrum 352 possesses the property that Fourier coefficients at locations which are multiple of four may accept non-zero values, while all the rest are identically zero. This property carries for any integral number of fragments, however we will focus on numbers which are powers of 2, such as 1, 2, 4, 8 etc., as this is closely related to FFT processing which is also typically implemented in blocks which are of power-of-2 size.

The discussed spectral properties of repeated signals carry both for signals generated in frequency domain and for single-carrier signals.

When single-carrier signals are repeated, the PAPR properties of the single-carrier signal are retained. When several stations transmit signals possessing comb-like spectrum, it is desirable to stagger the signals in frequency in order to achieve orthogonality and avoid mutual interference. Note that offsetting the carrier frequency of a single-carrier signal (either continuous or repeated) does not degrade its PAPR properties.

Figure 4B:
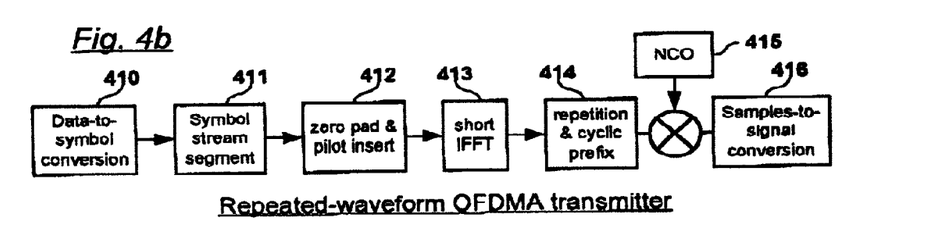
FIG. 4b is a simplified illustration of Repeated-waveform OFDMA transmitter
Figure 4C:
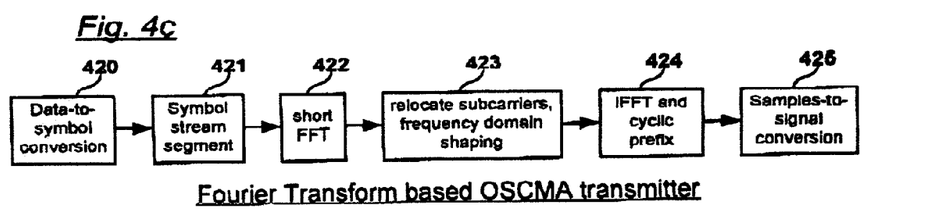
FIG. 4c is a simplified illustration of Fourier Transform based OSCMA transmitter
Figure 4D:
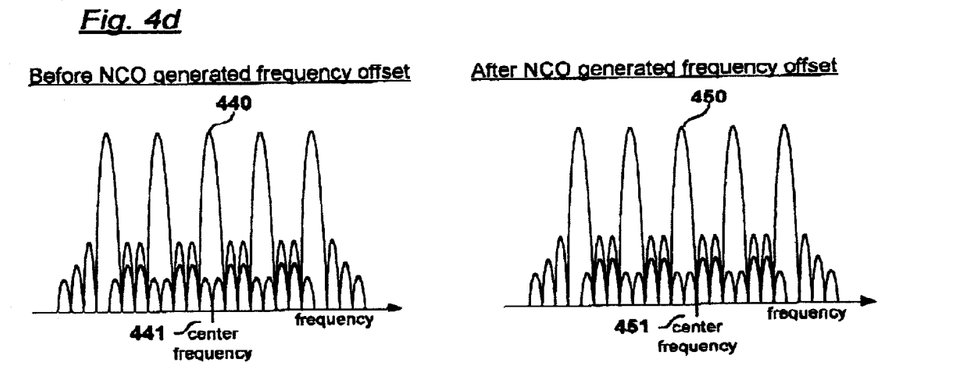
FIG. 4d illustrates the effect of frequency offset imposed on the signal by a Numerically Controlled Oscillator.

FIGS. 4a-4c show several implementations of multiple-access transmitters utilizing repeated waveforms. FIG. 3a shows an OSCMA transmitter in which the symbol stream is divided by block 401 into segments of variable size which are then repeated in block 402 several times. The size of the segments and the number of repetitions are determined by the multiple-access controller. The length of the segment depends on the number of repetition so as to maintain constant duration of the repeated signal. The repetition process may be extended to further include the generation of a cyclic prefix, which is desirable for frequency-domain processing on the receiving side. After performing the operation of shaping and interpolation of the symbol stream in block 403, a frequency offset is imposed on the signal by multiplying (in block 405) its samples with those generated by a Numerically Controlled Oscillator 404. The effect of this operation is exemplified in FIG. 4d, where we can see that after replication operation one of the subcarriers (440) coincides with center frequency (441) while after the action of the NCO same subcarrier (450) is offset with respect to the center frequency (451). The implementation benefit of this scheme is that the desired spectral properties of the signal are achieved by time domain processing only, without involving any Fourier transform implementation.

FIG. 4b shows an OFDMA transmitter implementation, which utilizes the properties of repeated waveforms in order to reduce the implementation complexity of the transmitter. In this case the initial waveform segment is generated by a short length IFFT (block 413) consuming little implementation resources (hardware, memory, processing time), while the full-length waveform is generated by the much-simpler replication process performed by block 414. In this implementation we also utilize the NCO unit (415) to achieve frequency offsetting of the resulting subcarrier comb.

The third implementation of an OSCMA transmitter suggested according t the present invention, which is exemplified in FIG. 4c, does not attempt to save on Fourier transform processing. On the contrary, it converts the stream of single carrier samples into frequency domain (block 432), and then performs the relocation of subcarriers to equally spaced locations and weighting by the shaping filter in frequency domain (block 423). The resulting numeric array is then IFFT-transformed into time domain samples, a cyclic prefix is added (block 424) and the resulting sample stream is sent to the medium via block 425. In this implementation the frequency offsetting may be achieved by choosing the subcarrier locations within the numeric array, rather than by an NCO. This implementation may be beneficial in dual mode (OSCMA and OFDMA) transmitters. In this case it is the PAPR benefit of OSCMA, which is sought after. Additional potential use of this type of processing is to replicate the frequency domain components into adjacent frequency locations. This results in "spectrum squeezing", equivalent to "time domain stretching"—an operation that also preserves the PAPR properties of single-carrier waveform.

The above mentioned principles can be applied to systems employing multiple transmit chains, such as, for example, space-time coded systems, by performing the segmentation, replication and frequency offsetting process (with same set of parameters) in each of the transmit chains.

Figure 5:
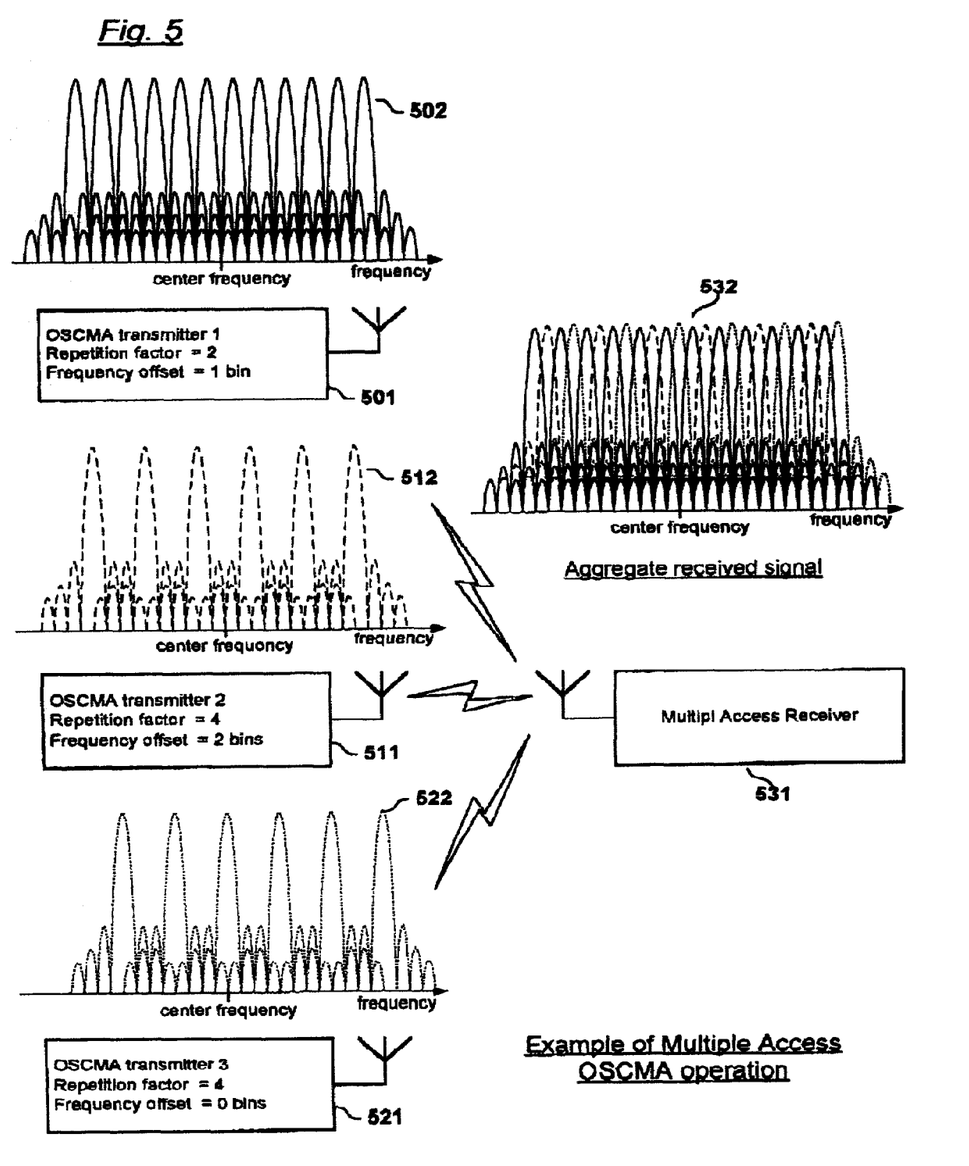
FIG. 5 illustrates an example of Multiple Access OSCMA operation.
Figure 6:
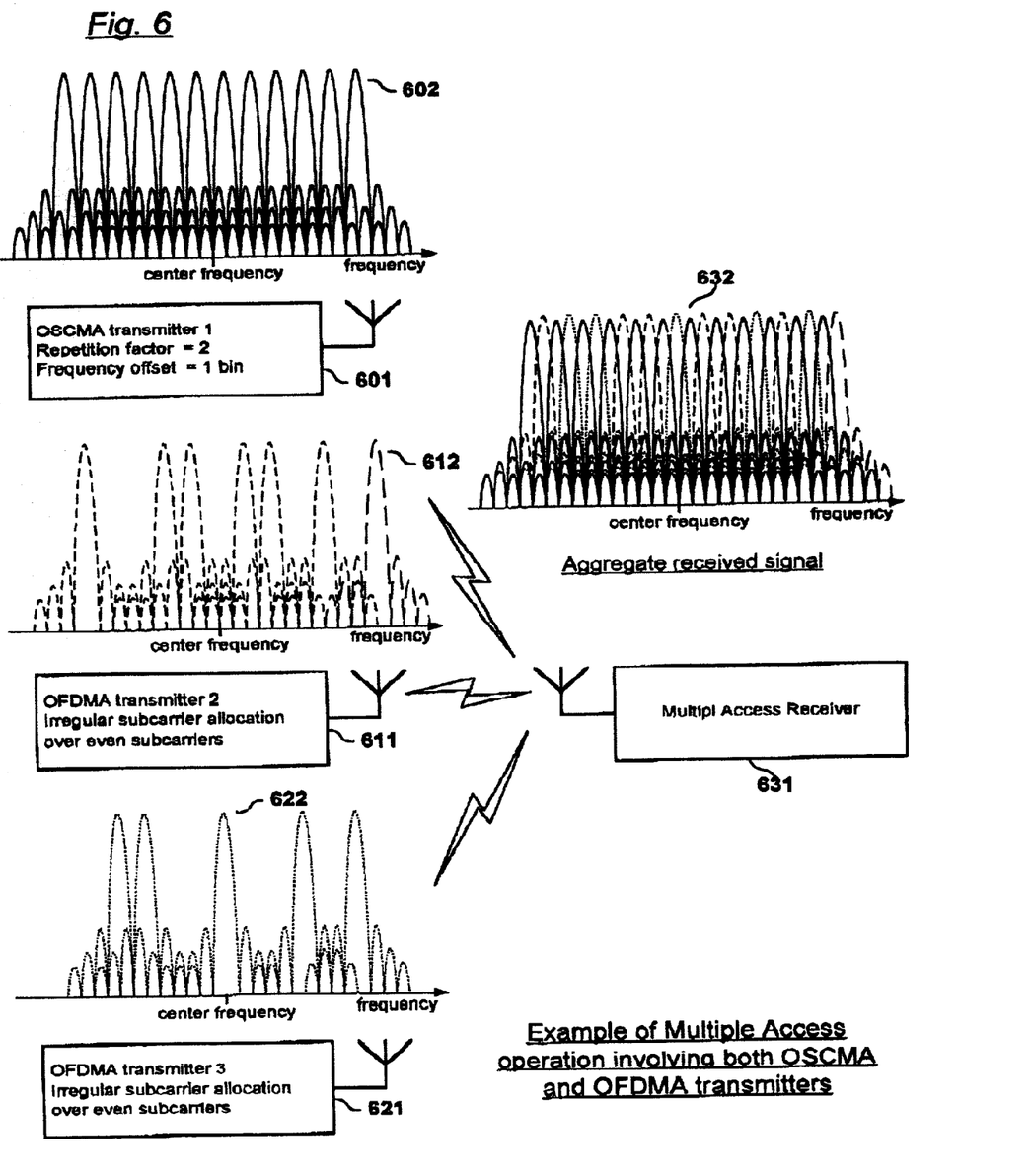
FIG. 6 illustrates an example of Multiple Access operation involving both OSCMA and OFDMA transmitters

FIGS. 5 and 6 exemplify the multiple-access operation aspects of the above-described transmitters. FIG. 5 focuses on the case that only OSCMA transmitters are used. In the example in the FIG. 5, OSCMA transmitters (510, 511, 521) are operating. OSCMA transmitter 1 (501) is assigned by the base station's MAC controller to transmit with repetition factor 2 and with frequency offset equivalent to one bin, resulting in utilization of odd subcarriers. The OSCMA transmitters 2 and 3 (511, 521) are both assigned repetition factor 4, but different frequency offsets: 2 bins for transmitter 2, and 0 bins for transmitter 3. The resulting spectra 502, 512 and 522 are all disjoint, assuring that after the receiver 531 processes the sum spectrum 532 it is capable of separating the subcarriers belonging to different transmitters without mutual interference. The operation of the receiver will be discussed in more detail in the sequel.

FIG. 6 focuses on exemplifying the case in which both OSCMA transmitters and OFDMA transmitters are present. In the depicted example the OSCMA transmitter 1 (601) utilizes odd subcarriers, as before. The two other transmitters 2 and 3 (611 and 621) are OFDMA transmitters capable of irregular subcarrier allocation. Each of those is assigned a disjoint irregular subset of the even subcarriers (612 and 622), so that again the receiver (631) is capable of separating the resulting sum spectrum into the contributions of the different transmitters.

Figure 7:
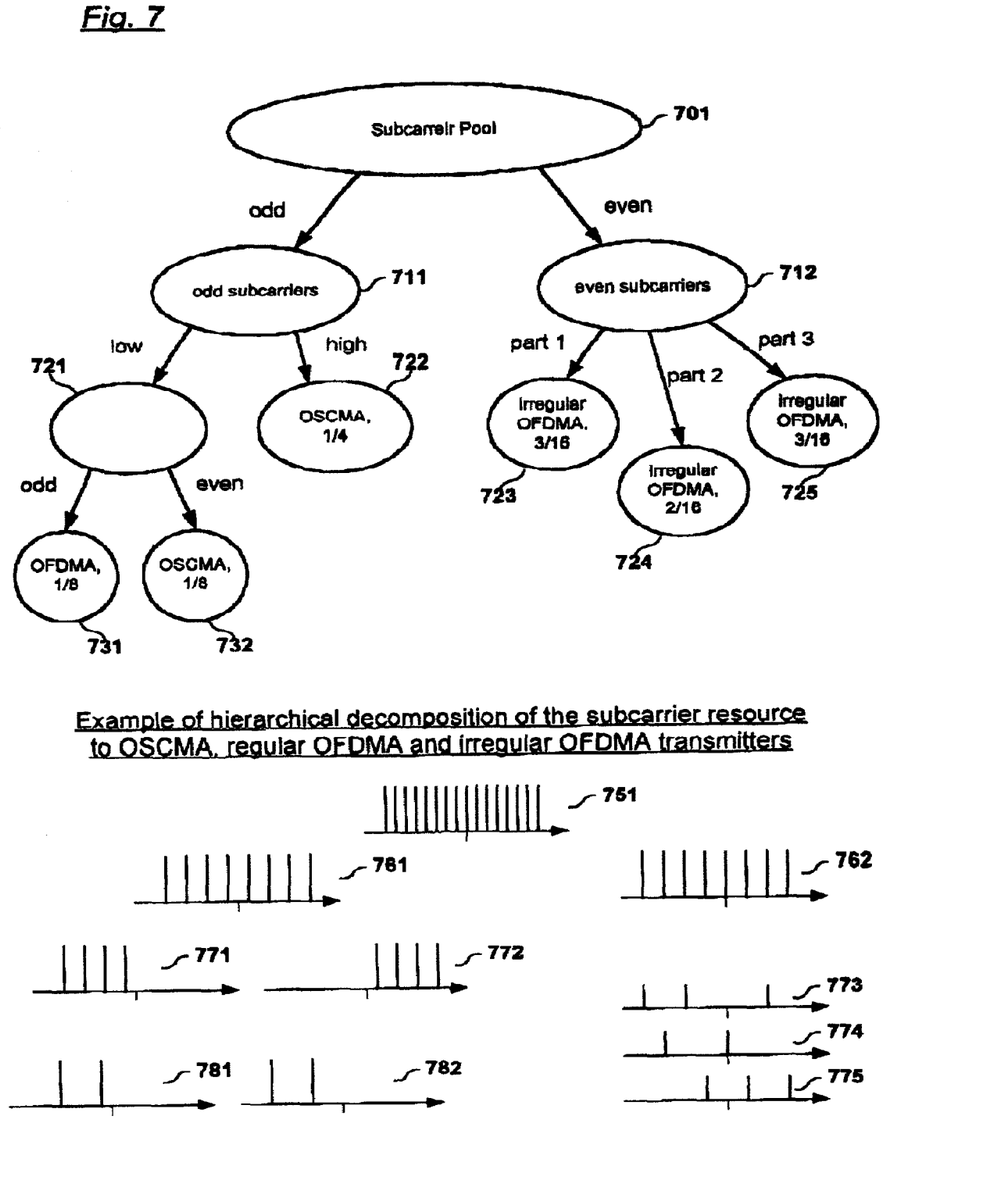
FIG. 7 illustrates an example of hierarchical decomposition of the subcarrier resource to OSCMA, regular OFDMA and irregular OFDMA transmitters

FIG. 7 depicts a possible strategy of allocating subcarrier sets to users in OSCMA only or in mixed OSCMA-OFDMA deployment scenarios. The allocated frequency channel is divided into a pool of equally spaced subcarriers (block 701, exemplified graphically in 751). The resulting resource is then divided into allocation quanta by a process of hierarchical halving. The hierarchical halving results in allocation quanta which are either whole, ½, ¼, ⅛ etc. of the whole resource. This property readily associates with the fact that FFT algorithm is performed on vectors of size $2^K$, and therefore it is preferred that the number of waveform repetitions (which is a reciprocal of the allocation size) is also a power of 2. Note that this restriction is not imposed on the part of the resource which is designated for irregular OFDMA—those can utilize any fraction of the subcarriers. The allocation method described above allows mixing OSCMA, regular OFDMA and irregular OFDMA transmitters in same deployment. Additional flexibility inherent in the hierarchical halving approach is that the halving can be performed at each stage either by dividing the subcarriers into odd set (711, exemplified graphically in 761) and even set (712, exemplified graphically in 762), or by dividing into lower half (721, exemplified graphically in 771) and upper half (722, exemplified graphically in 772). Repetitive usage of low-high division results in clustered allocations that, as mentioned before, have advantages in some scenarios. In the example of FIG. 7 the subcarrier subset 712 is divided irregularly into sets 723-725, corresponding to the graphical illustration of division of set 762 into sets 773-775. The operation of both OSCMA and irregular OFDMA in the same multiple access domain allows OSCMA transmitters to enjoy the advantages of irregular subcarrier allocation in spite of the fact that their subcarriers are spaced regularly. Indeed, if even subcarriers are allocated to OSCMA stations and even subcarriers to irregular OFDMA stations, the subcarriers of any two OSCMA transmitters are at least two bins apart, while the interaction between the signals of OSCMA transmitter and an irregular OFDMA transmitter is similar to interaction between irregular OFDMA signals in the sense that only a fraction of the subcarriers of the two transmitters are adjacent.

Figure 8A:
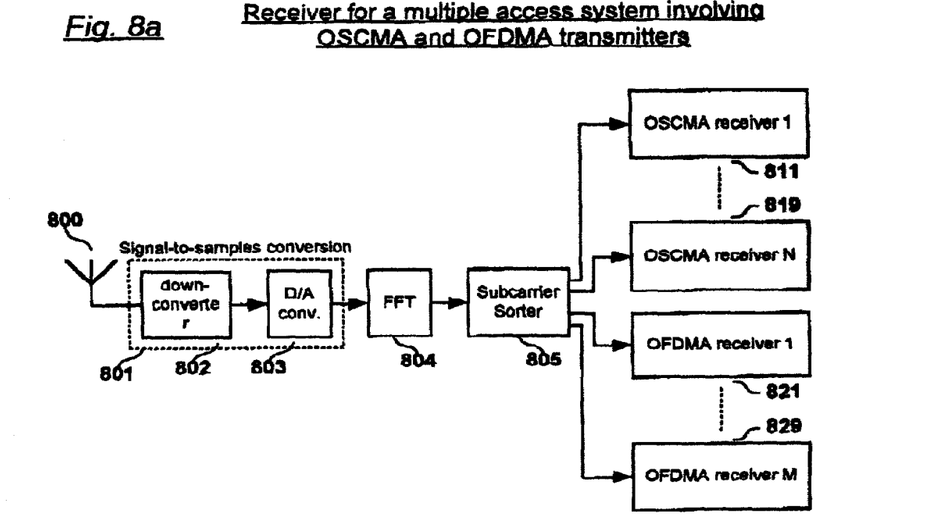
FIG. 8a illustrates a receiver for a multiple access system involving both OSCMA and OFDMA stations
Figure 8B:
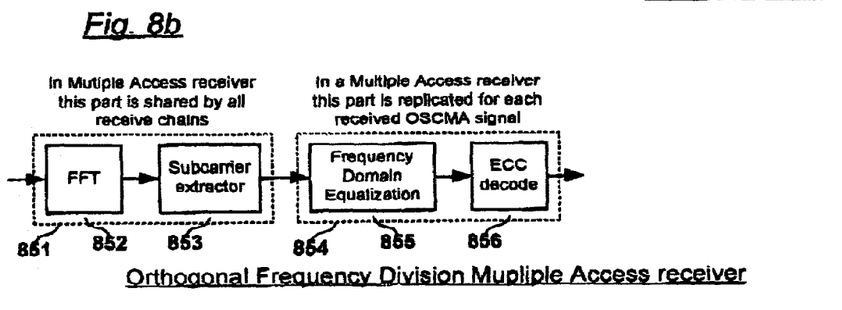
FIG. 8b illustrates an orthogonal Frequency Division Multiple Access receiver.
Figure 8C:
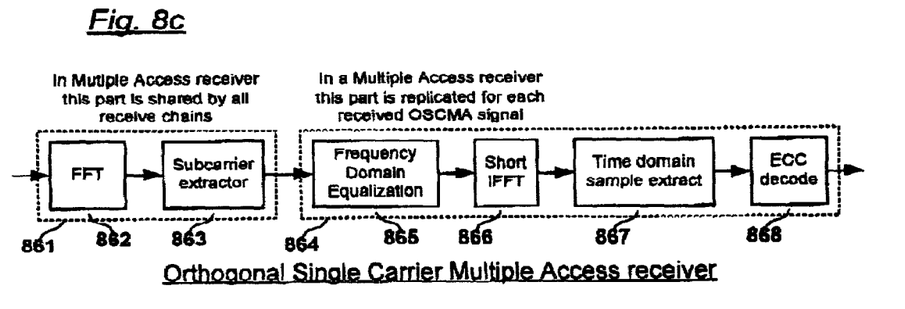
FIG. 8c illustrates an orthogonal Single Carrier Multiple Access receiver. OSCMA and OFDMA transmitters.

For completeness, we would like to address the structure of the multiple-access receiver (see FIG. 8a(. The first part of the receiver resembles an OFDMA transmitter in that the received waveform is decomposed into subcarriers (block 800) and the subcarriers are sorted into groups (block 805), each group corresponding to a different upstream transmitter. The groups are then directed to the per-station modems (receivers) (blocks 811-829). Each of the modems operates on its own subcarriers and needs not be aware of other subcarriers, due to the orthogonality property. In pure OFDMA system all the modems are of the OFDMA type. In a mixed OSCMA-OFDMA system every modem is configured to process the corresponding modulation format, with a set of parameters provided by the MAC controller. The modem is informed of the modulation format, number of subcarriers and other parameters essential for the demodulation process. For OSCMA modems, the processing is similar to the SC-FDE processing, as described in 8c. The main difference is that the size of the FFT applied after the frequency domain equalization (and the number of symbols generated) varies according to the allocation size (repetition factor in the transmitter). In OFDMA modems the familiar processing of per-subcarrier equalization and ECC decoding is performed.

While the above description contains many specificties, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A transmitter for a multiple access passband communication system, which is capable of generating signals comprising data-carrying signal frames and wherein said transmitter comprises:
    means for dividing said data-carrying signal frames into at least two data-carrying signal segments;
    replicating means for replicating the data-carrying signal segments to form time-domain repetitions of the data-carrying signal segments; and
    offsetting means for offsetting said time domain repetitions of the data-carrying signal segments from a first carrier central frequency at which said transmitter is operative, by a frequency offset,
    wherein said transmitter is operative to transmit the offset time-domain repetitions of the data-carrying signal segments, and where a time-domain replication effect generated by the replicating means is achieved by filling a frequency-domain array with frequency-domain values at equally spaced locations and performing an inverse Fourier transform thereon.

2. The transmitter of claim 1, where the offsetting of said time domain repetitions of the data-carrying signal segments is achieved by placing the frequency-domain values into the frequency-domain array at equally spaced locations which are offset from a center of the frequency-domain array.

3. The transmitter of claim 1, where the offsetting means comprises a Numerically Controlled Oscillator (NCO) and a multiplier.

4. The transmitter of claim 1, where symbols of each of said time-domain repetitions of the data-carrying signal segments are modulated in accordance with a modulation scheme selected from the group consisting of Amplitude Shift Keying (ASK), Phase Shift Keying (PSK), Quadrature Amplitude Modulation (QAM), Offset Quaternary Phase Shift Keying (OQPSK), Offset Quadrature Amplitude Modulation (OQAM), Minimum Shift Keying (MSK), and/or Continuous Phase Shift Keying (CPFSK) modulations.

5. The transmitter of claim 1, where the each of said time-domain repetitions of the data-carrying signal segment comprises an Orthogonal Frequency Division Multiplexing (OFDM) signal.

6. The transmitter of claim 1, where said means for dividing, said replicating means, and said offsetting means operate on multiple transmit channels.

7. A multiple access communication system comprising a plurality of transmitters capable of generating transmitted signals according to the method of either claim 4 or claim 5, in which each transmitter is assigned a repetition factor and a frequency offset.

8. The multiple access communication system of claim 7, wherein at least some of the plurality of transmitters are capable of generating Orthogonal Frequency Division Multiple Access (OFDMA) signals with an arbitrarily chosen set of OFDMA subcarriers.

9. The multiple access communications system of claim 7, in which each of the plurality of transmitters is operative to use a particular modulation scheme according to channel conditions.

10. The system of claim 8, in which the set of OFDMA subcarriers is hierarchically partitioned into a plurality of subcarrier sets, and in which the plurality of subcarrier sets are dynamically assigned to users according to a resource allocation policy.

11. The system of claim 10, wherein the resource allocation policy is governed according to transmitter capabilities, respective transmitter budget and traffic demand.

12. The transmitter of claim 4, where the frequency-domain values filled into said frequency-domain array are derived by Fourier-transforming an array of symbol values comprised in said data-carrying signal segment according to the selected modulation scheme.

13. A multiple access receiver capable of receiving a signal comprising multiple superimposed signals generated by one or more transmitters of claim 1, wherein said receiver is adapted to carry out Fourier transform on the received signal, thereby converting said received signal into an array of frequency-domain values, and to recover data comprised in each of said multiple superimposed signals by demodulating said array of frequency-domain values.

14. A transmission apparatus for transmitting a signal, comprising:
- modulation means for generating a transmission symbol signal from an incoming source data;
- means for splitting the transmission symbol signal into segments of a size related to a desired repetition ratio;
- replicating means for creating at least one repetition of each of said segments as a replicated signal;
- filtering means for shaping the replicated signal as required by a respective modulation scheme and rejecting any extra images of the replicated signal;
- frequency offset means for shifting a frequency center of the filtered replicated signal;
- samples-to-signals conversion means for converting digital samples of the offset filtered replicated signal into an analog signal, and
- where a time-domain replication effect of the replicating means is achieved by filling a frequency-domain array with frequency-domain values at equally spaced locations and performing an inverse Fourier transform thereon.

15. The transmission apparatus according to claim 14 wherein the frequency offset means is operative to place values of the filtered replicated signal into a frequency-domain array at equally spaced locations offset from a frequency center of the filtered replicated signal.

16. The transmission apparatus according to claim 14 wherein the frequency offset means comprises a Numerically Controlled Oscillator (NCO) and a multiplier.

17. A method of preparing source data for transmission, said method comprising the steps of;
- generating a transmission symbol signal from incoming source data according to a specified modulation scheme;
- splitting said transmission symbol signal into segments of a size related to a desired repetition ratio;
- replicating each of said segments thus creating at least two repetitions thereof and generating a replicated transmission signal;
- shaping the replicated transmission symbol signal as required by the specified modulation scheme and rejecting any extra images of the signal thereof;
- shifting a frequency center of the shaped signal to obtain offset frequency signals; and
- converting the offset frequency signals thus obtained into transmission signals,
- where a time-domain replication effect of the replicating step is achieved by filling a frequency-domain array with frequency-domain values at equally spaced locations and performing an inverse Fourier transform thereon.

18. A transmission apparatus for transmitting a signal, comprising:
- modulation means for generating a transmission symbol signal from an incoming source data;
- means for splitting the transmission symbol signal into segments of a size related to a desired repetition ratio;
- means for converting the transmission symbol signal segments into frequency domain values;
- replicating means for creating at least one repetition of each of said segments as a replicated signal;
- filtering means for shaping the replicated signal as required by a respective modulation scheme and rejecting any extra images of the replicated signal;
- frequency offset means for shifting a frequency center of the filtered replicated signal;
- samples-to-signals conversion means for converting digital samples of the offset filtered replicated signal into an analog signal, and
- where the replication and the offsetting are achieved by placing frequency-domain values into a frequency-domain array at equally spaced locations which are offset from a center of the frequency-domain array and performing an inverse Fourier transform thereon.

19. A method of preparing source data for transmission, said method comprising the steps of;
- generating a transmission symbol signal from incoming source data according to a specified modulation scheme;
- splitting said transmission symbol signal into segments of a size related to a desired repetition ratio;
- converting the transmission symbol signal segments into frequency domain values;
- replicating each of said segments thus creating at least one repetition thereof and generating a replicated transmission symbol;
- shaping the replicated transmission symbol signal as required by the specified modulation scheme and rejecting any extra images of the signal thereof;
- shifting a frequency center of the shaped signal to obtain offset frequency signals;
- converting the offset frequency signals thus obtained into transmission signals, and
- wherein the replication and the offsetting are achieved by placing frequency domain values into a frequency-domain array at equally spaced locations offset from a center of the frequency-domain array and performing an inverse Fourier transform thereon.

* * * * *